Patented Oct. 26, 1926.

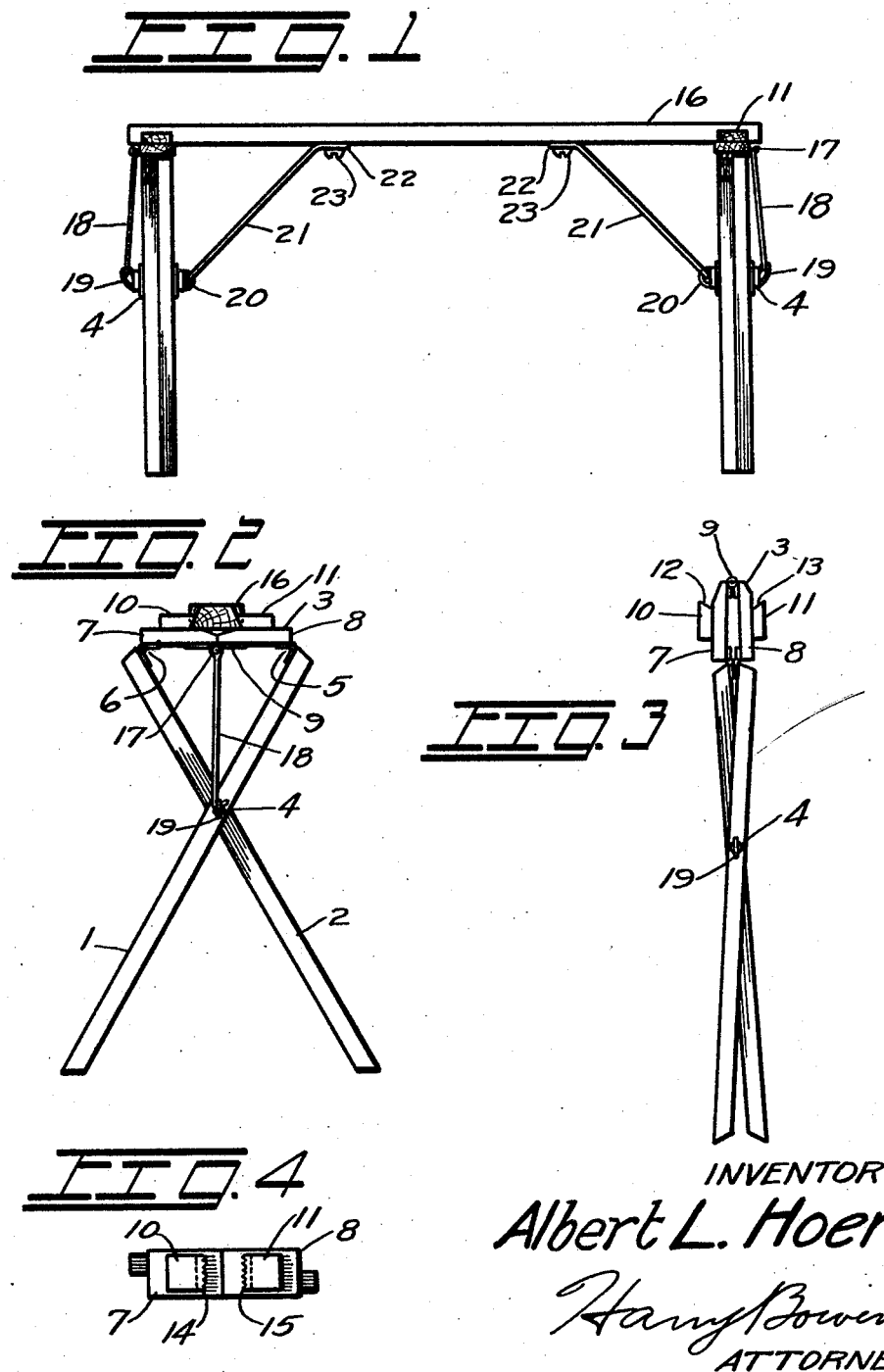

1,604,824

UNITED STATES PATENT OFFICE.

ALBERT L. HOEN, OF SEATTLE, WASHINGTON, ASSIGNOR OF ONE-HALF TO JESSE M. WARREN, OF SEATTLE, WASHINGTON.

COLLAPSIBLE SAWHORSE.

Application filed November 25, 1925. Serial No. 71,285.

The invention includes a pair of collapsible legs that are adaptable to be used as a saw horse or the like.

The object of the invention is to provide a saw horse that may readily be folded and carried from one job to another.

Another object of the invention is to provide a readily collapsible device that may be used to form a saw horse or other similar devices.

With these ends in view the invention embodies a pair of legs, pivotally attached to each other, a member hinged at the center and having each end connected to the upper ends of the legs, cleats on top of the said latter member, and suitable braces for holding the members in the open position.

Other features and advantages of the invention will appear from the following description, taken in connection with the drawings, wherein:—

Figure 1 is a side view showing the device in the form of a saw horse.

Figure 2 is an end view of the device as shown in Figure 1.

Figure 3 is a similar view showing the device in the folded position.

Figure 4 is a plan view of one of the end members.

In the drawings I have shown my device as it would be made, wherein numerals 1 and 2 indicate the legs and numeral 3 indicates the cross members.

The legs 1 and 2 are made of straight bars as shown and pivoted together by pins 4 as shown. At the upper ends of these members are hinges 5 and 6 by which they are hinged to the ends of the member 3. The member 3 is divided into two sections 7 and 8, and these sections are connected at the center by a hinge 9 and on top of the members 7 and 8 are cleats 10 and 11, the inner edges of which are bevelled, as shown at 12 and 13, and provided with teeth 14 and 15, as shown in Figure 4. It will be observed that when a cross member, as indicated by the numeral 16, is placed on the device, the teeth will be forced into the sides of the cross member and thereby positively hold it in place.

At the ends of the hinges 9 are pins 17 upon which hooks 18 are mounted and it will be observed that the opposite ends of the hooks may be hooked into eyes 19 on the pins 4. At the inner ends of the pins are other eyes which are indicated by the numeral 20, and braces 21 are held in these eyes. The outer end of the brace 21 is flattened as shown at the point 22 and may be held to the underside of the cross member 16 by a screw 23 as shown.

It will be observed that when in use the legs 1 and 2 will be opened to the position shown in Figure 2 with a cross member rigidly held between the cleats 10 and 11. The hooks 18 will then be placed through the eyes 19 to hold the central portions of the members 3 in place, or in the position shown in Figure 2, and then the braces 21 may be attached to the lower side of the cross member to make the device rigid. It will be observed that when it is desirous to move the device the braces may be removed and the hooks unfastened, and then it will be possible to remove the cross member and fold the legs to the position shown in Figure 3, in which position the device may readily be carried.

It will be understood that changes may be made in the construction without departing from the spirit of the invention, one of which changes may be in the use of any material other than that shown; another may be in the shape or design of any of the members; and still another may be in the use of other means for holding or bracing any of the members.

Having thus fully described the invention, what I claim as new and desire to secure by Letters Patent, is:—

In a collapsible saw horse, two straight members pivotally attached about midway of their lengths, a bar, a hinge joint at the center of the said bar, other hinges attaching the ends of the said bar to the ends of the two said straight members, cleats with beveled inner ends on the respective sections of the said bar, a cross member clamped between the said cleats, a diagonal brace attached to the said cross member and to the point at which the two said straight members are pivotally attached, and a hook connecting the center of the said hinged bar to the pivot point of the two said straight members for holding the said hinged bar in the open position.

In testimony whereof I hereby affix my signature.

ALBERT L. HOEN.